United States Patent [19]

Pavliny

[11] 4,000,442
[45] Dec. 28, 1976

[54] VEHICLE LIGHTNING PROTECTION DEVICE

[76] Inventor: William Pavliny, 4722 N. Delphia Ave., Chicago, Ill. 60656

[22] Filed: Dec. 18, 1975

[21] Appl. No.: 641,882

[52] U.S. Cl. .............................................. 317/2 D
[51] Int. Cl.² ........................................ H05F 3/00
[58] Field of Search ........... 317/2 R, 2 D, 2 E, 2 F, 317/61; 307/10 R

[56] References Cited

FOREIGN PATENTS OR APPLICATIONS

| 1,330,252 | 5/1962 | France | 317/2 D |
| 1,254,440 | 1/1960 | France | 317/2 D |
| 1,245,016 | 9/1959 | France | 317/2 D |

Primary Examiner—Harry Moose

[57] ABSTRACT

Lightning protection device of pleasing and ornamental shape and color for installation at a point on a land vehicle, particularly a point of attachment on a horizontal outside upper surface area thereof. The device comprises a charge accumulating ball with a base, a sharp pointed, space discharge electrode atop the ball, and fastening means including an electrical contact and securing together the base and the upper surface area, which area if sheet metal has the contact clamped thereto by the fastening means in electrically conductive connection to complete the circuit thereto from the electrode.

10 Claims, 5 Drawing Figures

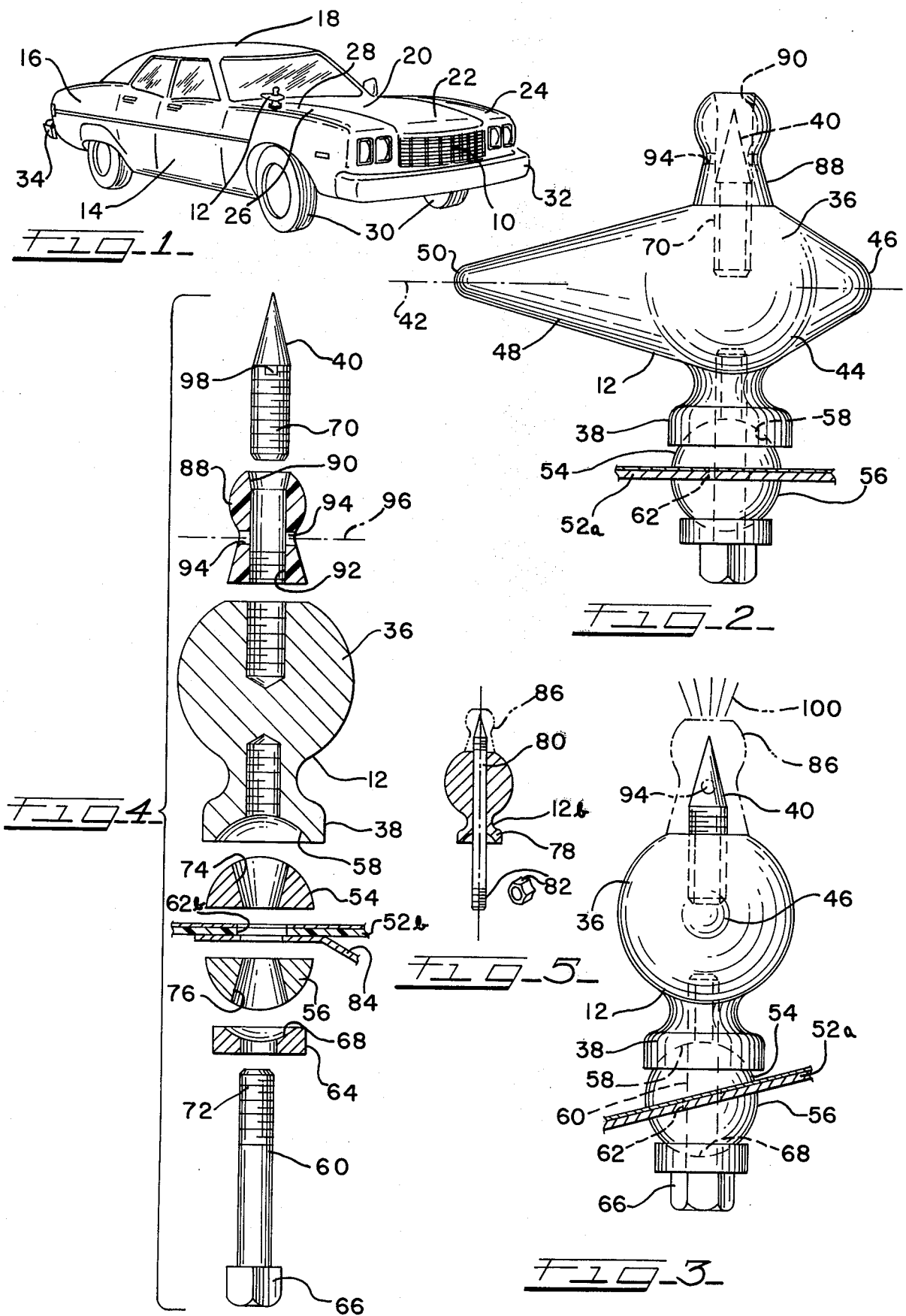

VEHICLE LIGHTNING PROTECTION DEVICE

This invention relates to a lightning protection device of pleasing and ornamental shape and color for installation at a point on a vehicle, and particularly for attachment to an outside point on an automobile on a top surface thereof, one essentially horizontally disposed.

Vehicles in motion, or after they come to rest, can be struck by lightning largely because of the concentration of metal in common vehicular components, and a factor not to be overlooked in how those components collectively can sometimes attract a bolt of lightning is the residual charge of static electricity therein which tends to build up. That charge in a number of cases can build up to a level and remain there quite independently of the local ground charge present, if at all, and can noticeably exceed it in many instances.

A device is provided on a vehicle in accordance with my invention to give it improved appearance to an acceptable degree, but primarily to afford protection to the vehicle in a way materially reducing if not substantially eliminating hits from lightning and the damage therefrom, as will now be explained in detail. Features, objects, and advantages will either be specifically pointed out or become apparent when, for a better understanding of my invention, reference is made to the following description taken in conjunction with the accompanying drawing, which shows certain preferred embodiments thereof and in which:

FIG. 1 is a right front quarter, elevational perspective view of a vehicle embodying a protection device according to my invention;

FIGS. 2 and 3 are respective right side and front elevational views of the device to larger scale;

FIG. 4 is an exploded, front elevational view of the protection device as it would be installed in an upper location above the surface member of a vehicle with a plastic or other non-metallic body; and FIG. 5 is an elevational view in section of a modified form of the invention.

More particularly in the drawing, an automotive vehicle 10 as shown equipped with the device 12 is a 4-door sedan which generally but not necessarily has a metal body 14. Among other upper body components having horizontal panel portions which can serve as useful mounting surfaces are fenders at the rear such as a right rear fender 16, a roof panel 18, a hood 20, particularly at its front portion 22, and left and right front fenders 24 and 26, to the right one 26 of which the device 12 is installed on the essentially horizontal surface area 28 thereof at the rear.

A body supporting chassis includes a frame, not shown, which in the usual way carries the wheels 30, an engine, not shown, beneath the hood 20, and the front and rear bumpers 32 and 34 all of which along with the body add to the collective mass of interconnected metal of the vehicle.

The device 12 is metal and includes a charge collecting ball 36 having a base 38 and a sharp pointed, upright space discharge electrode 40 atop the ball 36. The ball 36 is generally football shaped along its horizontally disposed, longitudinal axis 42 and, at the front, has a rather drastically tapering streamline portion 44 of frusto-conical shape terminating in a rounded nose 46. A rear streamline portion 48 of the ball is analagously shaped, although more gradually tapering down to a rounded tail 50.

For attachment of the device 12 to body sheet metal 52a forming, for example, the right front fender 26 in the horizontal panel surface area 28 at the rear thereof, a means of universally connecting the device is provided including upper and lower ball parts 54 and 56. The lower one 56 of the parts serves as the metal contact in electrically conductive connection with the unpainted side of the sheet metal 52a to complete the circuit thereto from the electrode 40.

The upper one 54 of the ball parts, which though not essentially but, for uniformity, can each be semispherical and be duplicates of one another, forms a ball and socket joint with a complementary semispherical socket 58 in the bottom surface of the ball base 38.

A bolt 60 passing through the ball parts 54, 56 and a fastener opening 62 in the sheet metal, and screwed into the base 38, fastens the parts 54, 56 aligned with, and clamping the sheet metal on opposite sides of, the opening 62. An apertured washer 64, which can be of the special complementary shape as illustrated if desired, is provided between the bolt head 66 and lower ball part 56 so as to present a mating socket 68 gripping the outside of the part 56.

In FIG. 4, the device 12 is drilled and tapped downwardly in the ball 36 so that the electrode 40 can at its threaded end 70 be screwed in and anchored in the ball. The device 12 is drilled and tapped upwardly in the base 38 so as to receive and anchor the bolt 60 at its threaded end 72.

The ball parts 54, 56 lend themselves well to the purpose of the universal connection because, when installed, they mutually present a generally spherical surface on the outside. For that purpose, a ball hole 74 provided in the part 54 for the bolt 60 and a registering, counterpart ball hole 76 provided in the part 56 are conically shaped and emerge from the parts with the large end opening onto the spherical outside surface. So before the bolt 60 is drawn completely tight with the sockets 58, 68 immovably clamped against the outside of the fixed ball parts 54, 56, the shape of the holes 74, 76 allows the device 12 to be pivoted and twisted about the point of intersection of the bolt axis with the plane of the sheet metal. In other words, the fixed ball parts 54, 56 do not interfere with two freedoms of movement afforded the bolt 60 as it fulcrums about the above point of intersection; these freedoms enable the installer to swivel the device the two ways necessary in truing the ball axis 42 parallel to the longitudinal axis of the vehicle 10 for quiet, lamellar air flow thereover, and in truing the electrode 40 squarely upright for directing the discharge, despite the sheet metal 52a appearing in FIG. 3 being manifestly out-of-level.

MODIFICATION — FIG. 5

In a modified embodiment of my invention as shown according to this figure, the device 12b is for its major part unitarily preformed as a body 78 cast with a premachined, longitudinally disposed insert 80 permanently embedded coaxially in the metal of the casting. The insert 80 can, in one practical form, consist of a 5/16 inch (7.94 mm.) straight metal rod which is threaded and then smoothly conically pointed at the upper end as viewed in FIG. 5. The tightened holddown connection 82 at the lower end is made with a stud-and-threaded-on-nut in lieu of the previous bolt. The washer, clamped sheet metal, and socketed, fixed ball parts can be the same as previously shown and described and are omitted.

CARS WITH UPPER HORIZONTAL SURFACES OF PLASTIC — FIG. 4

In these plastic constructions, encountered with the fastener opening 62b thereof formed in an essentially horizontal panel surface area of plastic 52b, an apertured grounding strap 84 of suitable construction is inserted between the lower contact part 56 and lower surface of the panel of plastic 52b. One convenient construction is a long battery ground cable suitable as the grounding strap 84, and like the car battery itself the strap is grounded to the already grounded together, car engine or car frame.

The metal of the device is aluminum, brass, or cast iron, for example, and the components such as electrode, washer, ball parts, and ball and base can be made, although not necessarily, of different metal from one another. One illustrative, very satisfactory combination of parts of different metal in the embodiment of FIG. 5 utilizes a machined insert 80 of a highly conductive, high copper content brass such as red brass, and an aluminum body 78 cast thereabout.

A protective parts coating, especially for its decorative effect on the ball and base, will be included such as chrome or gold plating, or an ornamental anodized coating, dyed red or golden or dyed otherwise, all depending upon the base metal surface to be rust-proof treated or otherwise protectively decoratively treated and coated.

GUARD

Although the embodiments of FIGS. 3 and 5 may be left bare at the top, a guard is usually recommended to occupy the phantom area indicated by the phantom lines 86 as protection from accidental impalement or other possible personal injury against the point of the directly upstanding electrode 40.

A permanent dielectric, hollow guard 88 is illustrated in FIGS. 1, 2, and 4, and the dielectric material is preferably color matched to the color of the device 12. The material can be a suitably formed plastic, such as molded nylon, and will match the red shade of the device when the latter is red, or be a matching shade of gold when the device is gold, or chrome-colored and so forth. The purpose is to preserve this utilitarian electric device's attractive and clean-lined appearance.

The hollow interior of the guard 88 is outwardly flared with a bevel 90 at the upper end so as to be radially spaced apart on all sides from the point of the electrode 40, and carries internal threads 92 at the lower end interengaged about the threaded end 70 of the electrode 40 so as to be supported flush thereby atop the ball 36. Intermediate the upper and lower ends thereof, the guard 88 has a through opening formed by diametrically opposed inlet-outlet holes 94 which are aligned on a common horizontal axis 96. The outer margins of the holes 94 form the mouth edges for receiving a spanner wrench, not shown, to thread the guard 88 into place, the electrode 40 having previously been threaded into the ball 36 with a wrench, not shown, applied to an electrode flat 98 and a hidden flat diametrically opposite.

The hole axis 96 by means of the spanner wrench is trued parallel to the longitudinal axis of the vehicle 10, the same as ball axis 42 previously discussed. In that way, the inlet-outlet holes 94 define an effective pathway for directly induced flow of inlet air over the electrode 40, due to vehicle motion. Because the electrode point is kept straight up and directly open to the atmosphere above, the pathway also serves as a discharge for dew, melted snow and ice, rain, and other water collected adjacent and drained away from the exposed electrode in the guard. The axis 96 intersects the electrode 40 somewhere on the taper, slightly above the bottom end of the conical surface for unobstructed passage.

OPERATION — FIG. 3

In this figure, the charge dissipating effect of the electrode 40 into the atmosphere is indicated at 100. During the usual condition, and equally during extreme conditions such as when the vehicle is proceeding in the vicinity of ongoing electrical disturbances, there is a steady discharge in known way at 100, which keeps reducing the charge on the ball 36.

As the charge is depleted, the device due to the static electrical capacity of its charge accumulating ball 36 draws more of the charge from the engine, body, fender, and frame metal to its point of relatively high elevation. Keeping the charge level lowered to a safer value affords the desired protection against injury and against vehicle damage from lightning bolts.

The guard 88 is designed to function as an electrical non-entity to the foregoing operation, and interferes in no way with collecting or leaking-off the static charge in the device.

The device hereof is primarily adapted for use on land vehicles, confined as they are to surface operations on paving or other earth surfaces on which they move and which stay at the local ground potential of the soil in the vicinity. The device makes continuous contact with the ambient atmosphere and is therefore a continuously available vehicle accessory for its electrical operation.

Unlike the usual electrical accessory that puts electricity to work which it utilizes as valuable energy withdrawn from the vehicle's power driven electrical system, my electrical accessory device actually disposes of electricity in its operation, in a way materially increasing the chances of the vehicle becoming a non-preferential target for lightning hits; that is to say, the tendency will be that main bolts, leaders, chains, and stringers will preferentially seek out other objects about, or the earth surface directly, in the vicinity.

Variations within the spirit and scope of the invention described are equally comprehended by the foregoing description.

What is claimed is:

1. In a vehicle with plural top surfaces at least one of which is formed by essentially horizontal sheet metal:
    the combination with said vehicle, of an electrically conductive lightning protection device supported in conductive relation on, and in general registry with a fastener opening through, said sheet metal, said device including a charge accumulating ball with a base, a sharp pointed, space discharge electrode atop the ball, and fastening means at the base of the ball aligned with, and clamping the sheet metal on opposite sides of, said fastener opening, said means comprising at least one electrical contactor in electrically conductive connection with the sheet metal to complete the circuit thereto from the electrode.

2. The invention of claim 1, further including:
    a guard for the electrode supported thereabout atop the ball, the guard having a hollow interior radially spaced apart on all sides from the point of the electrode and having inlet-outlet means leading to the hollow interior and forming tool openings.

3. In a vehicle with plural upper surfaces at least one of which is presented by essentially horizontal sheet metal:

the combination with said vehicle, of an electrically conductive lightning protection device supported in conductive relation on, and in general registry with an opening through, the sheet metal, said device including a charge accumulating ball with a base, and with a generally horizontal longitudinal axis, a sharp pointed, exposed space discharge electrode atop the ball, and bipartite ball means socketed in and forming a ball joint with said base, the ball means being aligned with, and clamping the sheet metal on opposite sides of, said opening, at least one ball means part comprising an electrical contactor in direct, electrical conducting relation with the sheet metal surface to which clamped and said ball means accommodating swivel action of the device to true the ball axis aforesaid relative to stance of the vehicle and the electrode generally upright by way of correcting for the essentially horizontal sheet metal.

4. The invention of claim 3, further including:

a dielectric guard supported atop the ball in generally surrounding relation to the electrode, said guard having margin forming edges engageable by an installation tool and defining an inlet-outlet pathway for the induced flow of inlet air over the electrode and for discharge of drain water collected adjacent the exposed electrode.

5. Conveyance lightning protection device having:

a charge accumulating ball with a base and with a generally horizontal longitudinal axis, and a sharp pointed, space discharge electrode atop the ball, the base of said device having adjustable fastening means for attachment in the panel fastener opening of a metal support, said means having at least one electrical contactor for making electrically conductive connection with the support metal to complete the circuit thereto from the electrode and further having adjusting means to true the ball axis aforesaid in a directional sense and the electrode generally upright by way of correcting for any out-of-level attitude of the support.

6. The invention of claim 5 wherein said fastening means is characterized by:

bipartite ball means socketed in and forming a ball joint with said base, and constructed and arranged to register with, and to clamp the metal support on opposite sides of, the panel fastener opening, one ball means part affording relative swivel movement with said base socket to provide adjusting means in the described way, and one ball means part constituting the electrical contactor to complete the circuit in the described way.

7. The invention of claim 6 wherein said fastening means is further characterized by:

a threaded fastener passing through the panel fastener opening and through ball holes in the bipartite ball means, said fastener being anchored in said base for drawing the parts of the ball means together to clamp the metal support panel in the described way.

8. The invention of claim 7 wherein said fastening means is additionally characterized by:

the ball holes being conically formed with the large end emerging from the respective ball means parts and affording pivoting motion of adjustment of the fastener and device with respect to the relatively fixed ball means in accommodating relative swivel movement as described.

9. The invention of claim 5, further having:

a dielectric guard on the device at the sides of the space discharge electrode so as to be in at least partly surrounding relation to the point thereof.

10. The invention of claim 9, wherein said guard is characterized by a hollow interior radially spaced apart on all sides from the point of the electrode.

* * * * *